(12) United States Patent
Verma et al.

(10) Patent No.: US 12,368,468 B2
(45) Date of Patent: Jul. 22, 2025

(54) DEVICE DISCOVERY, SESSION SETUP, AND MAINTENANCE IN IEEE 802.15.4AB COMMUNICATIONS

(71) Applicant: Apple Inc., Cupertino, CA (US)

(72) Inventors: Lochan Verma, Danville, CA (US); Yong Liu, Campbell, CA (US); Robert Golshan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 18/472,934

(22) Filed: Sep. 22, 2023

(65) Prior Publication Data

US 2024/0106495 A1    Mar. 28, 2024

Related U.S. Application Data

(60) Provisional application No. 63/409,323, filed on Sep. 23, 2022.

(51) Int. Cl.
| | |
|---|---|
| *H04B 1/71* | (2011.01) |
| *H04B 1/7163* | (2011.01) |
| *H04W 8/00* | (2009.01) |
| *H04W 76/14* | (2018.01) |

(52) U.S. Cl.
CPC .......... *H04B 1/7163* (2013.01); *H04W 8/005* (2013.01); *H04W 76/14* (2018.02)

(58) Field of Classification Search
CPC ..... H04B 1/7163; H04W 76/14; H04W 8/005
See application file for complete search history.

(56) References Cited

U.S. PATENT DOCUMENTS

| | | | |
|---|---|---|---|
| 8,248,982 B2* | 8/2012 | Abhishek | H04W 8/005 370/347 |
| 11,815,616 B2 | 11/2023 | Hammerschmidt | |
| 2008/0175197 A1* | 7/2008 | Shao | H04W 72/02 370/329 |
| 2023/0037601 A1* | 2/2023 | Lee | H04B 1/7163 |
| 2023/0073116 A1* | 3/2023 | Ghosh | H04W 48/16 |

OTHER PUBLICATIONS

Samsung "Narrow Band Mirroring Channels"; IEEE 15-22-0386-00-04ab; Jul. 2022.

* cited by examiner

*Primary Examiner* — Dac V Ha
(74) *Attorney, Agent, or Firm* — Kowert, Hood, Munyon, Rankin & Goetzel, P.C.

(57) ABSTRACT

In order to eliminate the reliance of ultra-high bandwidth (UWB) standalone transceivers and narrow-band-assisted (NB-assisted) UWB transceivers on BLUETOOTH™ (BLE) usage, an NB radio may be used. The NB radio may be tightly coupled with the UWB radio, for example driven by the same time source, to enable leveraged use of ACP (Acquisition Packet) for discovery, session setup, and maintenance over UWB and/or NB-assisted UWB without the use of BLE. Rules for advertising ACP and scanning for ACP may be defined for two modes of operation. An ad-hoc discovery may be based on external acquisition triggers, while a managed discovery may be based on an ongoing discovery advertisement process. ACPs may thereby be transmitted over UWB and/or NB.

20 Claims, 10 Drawing Sheets

| Index | | Parameter | Size | Description |
|---|---|---|---|---|
| | Common Info | # of Per Session Info fields | 5 bits | Number of per session info fields |
| 0 | | Reserved | 3 bits | Reserved and set to 0 |
| 1 | | Next Block Interval | 4 Octets | Time remaining in RTSU until start of the next ranging block relative to the start of the current packet |
| 2 | | Next Round Interval | 2 Octets | Time remainig in RTSU until the start of the next active round relative to the start of the next ranging block |
| 2 | | Block Index | 2 Octets | Block idx of next block |
| 3 | | Hop Mode | 1 bit | 0: no hopping 1: Hopping Hopping sequence known a-priori to all devices. |
| 4 | | Round Index | 15 bits | Round Index for the block |
| 5 | Per-Session Info field | Block Duration | 3 Octets | In RTSU |
| 6 | | Round Duration | 1 Octets | In RTSU |
| 7 | | Slot Duration | 2 Octets | In RTSU |
| 8 | | Rng Round Usage | 3 bits | 0: one way ranging 1: SS-TWR 2: DS-TWR 3: MMS-ranging 4: non-ranging 5. Discovery 6-8: reserved |
| 9 | | CH Number | 5 bits | CH number for this session |
| 10 | | Preamble Code | 1 Octet | Preamble code used for this session |

FIG. 12

DEVICE DISCOVERY, SESSION SETUP, AND MAINTENANCE IN IEEE 802.15.4AB COMMUNICATIONS

PRIORITY CLAIM

This application claims benefit of priority of U.S. provisional application Ser. No. 63/409,323 titled "Device Discovery, Session Setup, and Maintenance in IEEE 802.15.4ab Communications", filed Sep. 23, 2022, which is hereby incorporated by reference in its entirety as though fully and completely set forth herein.

FIELD OF THE INVENTION

The present application relates to wireless communications, including discovery, session setup, and maintenance in wireless personal area network (WPAN) communications, for example in IEEE 802.15.4ab communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards.

One popular short/intermediate range wireless communication standard is wireless local area network (WLAN). Most modern WLANs are based on the IEEE 802.11 standard (or 802.11, for short). WLANs are marketed under the Wi-Fi brand name. WLAN networks link one or more devices to a wireless access point, which in turn provides connectivity to the wider area Internet. In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

Another popular short/intermediate range wireless communication standard is wireless personal area network (WPAN). Most modern WPANs are based on the IEEE 802.15 standard (or 802.15, for short.) WPAN networks link together one or more personal devices that are within effective communication range of each other. The IEEE 802.15.4 standard more specifically deals with low data rates and very long battery life (months or even years) at very low complexity. IEEE 802.15.4a is an amendment to IEEE 802.15.4 specifying additional physical layers (PHYs) to the original standard to provide higher precision ranging and localization capability (e.g., 1 meter or better accuracy), higher aggregate throughput, added scalability to data rates, longer range, and lower power consumption and cost.

The additional PHYs include an ultra-wideband (UWB) Pulse Radio (operating in the unlicensed UWB spectrum) and a chirp spread spectrum (operating in the unlicensed 2.4 GHz spectrum). UWB is characterized by the use of very low energy level for short-range, high-bandwidth (e.g., over 500 MHz) communications over a large portion of the radio spectrum. The International Telecommunication Union Radiocommunication Sector (ITU-R) currently defines UWB as a signal bandwidth that exceeds the lesser of 500 MHz or 20% of the arithmetic center frequency. Thus, pulse-based systems—where each transmitted pulse occupies the UWB bandwidth or an aggregate of at least 500 MHz of a narrow-band carrier (for example, orthogonal frequency-division multiplexing (OFDM))—can access the UWB spectrum under the rules. IEEE 802.15.4b provides specific enhancements and clarifications to IEEE 802.15.4a, such as resolving ambiguities, reducing unnecessary complexity, increasing flexibility in security key usage, and considering newly available frequency allocations, among others.

Most of the UWB transceivers rely on Bluetooth (BLE) for device discovery, UWB session setup and maintenance. Within a BLE-UWB device the BLE and UWB interface communicate through the application processor. This increases latency in communication between the two interfaces and increases the power consumption of the device leading to shorter battery life. Improvements are therefore desired.

SUMMARY OF THE INVENTION

Embodiments are presented herein of, inter alia, of methods and procedures for device discovery, session setup, and maintenance in wireless communications, e.g., in IEEE 802.15.4ab Communications. Embodiments are further presented herein for wireless communication systems containing at least wireless communication devices or user equipment devices (UEs) and/or access points (APs) communicating with each other within the wireless communication systems.

The reliance of ultra-high bandwidth (UWB) standalone transceivers and narrow-band-assisted (NB-assisted) UWB transceivers on BLUETOOTH™ (BLE) usage may be eliminated through the use of NB radio. Accordingly, in some embodiments, NB radio may be tightly coupled with UWB radio, for example both radios (or both types of radios) may be driven by the same time source, to enable leveraged use of ACP (Acquisition Packet) for discovery, session setup, and maintenance over UWB and/or NB-assisted UWB without the use of BLE. Rules for advertising ACP and scanning for ACP may be defined for two modes of operation. A first mode of operation, referred to as "ad-hoc discovery," may be based on external acquisition triggers. A second mode of operation, referred to as "managed discovery," may be based on an ongoing discovery advertisement process. ACPs may thereby be transmitted over UWB and/or NB.

ACP Transmission

In some embodiments, an apparatus or device may include a processor which may operate to cause the device to transmit, over a narrowband (NB) assisted ultra-wideband (UWB) discovery channel or over a UWB discovery channel, an acquisition packet (ACP) during an ACP interval, where the ACP indicates the presence of the device to other devices and provides information indicating UWB channel usage of the device to the other devices. The device may monitor the NB-assisted UWB discovery channel or the UWB discovery channel for an ACP response transmitted by a second device (of the other devices) responsive to the second device detecting the ACP, and may then establish a session with the second device responsive to receiving, from the second device, the ACP response on the NB-assisted UWB discovery channel or the UWB discovery channel.

The device may receive the ACP response within a specified time period following detection of the ACP by the second device. The device may also receive a first session packet from the second device, subsequent to receiving the ACP response. The device may remain on the NB-assisted UWB discovery channel or the UWB discovery channel until a session setup exchange with the second device has completed or until a timeout occurs. The device may cease acquisition behavior upon establishment of the session with the second device. In some embodiments, the device may transmit the ACP responsive to a trigger input received by the device. In addition, the device may transmit, subsequent to establishing the session with the second device, an update to be used by the second device to maintain the session.

In some embodiments, the device may periodically transmit ACPs. The device may execute a background process for periodically transmitting the ACPs, and may dynamically adjust an ACP interval length between transmission of a first ACP and a second ACP of the periodically transmitted ACPs. In some embodiments, the device may transmit the ACP during an active round of an advertisement session. The active round may include the ACP interval, a contention access period (CAP), and a contention free period (CFP). The device may receive the ACP response within the CAP. Additionally, the device may transmit and receive a session maintenance handshake packet or a session setup handshake packet during the CFP. A minimum length for the ACP interval and the CAP may be determined based on time requirements for successful transmission of the ACP and successful reception of the ACP response. The ACP may include information about a composition of the active round.

In some embodiments, the packets transmitted over the UWB discovery channel may be of a Base Pulse Repetition Frequency (BPRF) format, and packets transmitted over the NB-assisted UWB discovery channel may be of an Offset Quadrature Phase Shift Keying (O-QPSK) format. Furthermore, the ACP may include common session information corresponding to all sessions conducted by the device, and/or respective per-session information corresponding to each individual session conducted by the device. The common session information may include information about the respective per-session information.

ACP Detection

In some embodiments, an apparatus or device may operate to cause the device to detect, over a narrowband (NB) assisted ultra-wideband (UWB) discovery channel or over a UWB discovery channel, an acquisition packet (ACP) during an ACP interval, where the ACP indicates the presence of a corresponding device to other devices and provides information indicating UWB channel usage of the corresponding device to the other devices. The device may transmit an ACP response to the corresponding device in response to detecting the ACP, and may establish a session with the corresponding device responsive to the corresponding device receiving the ACP response on the NB-assisted UWB discovery channel or the UWB discovery channel.

The device may detect, over the narrowband (NB) assisted ultra-wideband (UWB) discovery channel or over the UWB discovery channel, additional one or more ACPs from corresponding one or more additional devices, and may transmit a respective ACP response to each of the corresponding one or more additional devices in response to detecting the additional one or more ACPs. The device may also establish a respective session with each of the corresponding one or more additional devices responsive to the corresponding one or more additional devices receiving the respective ACP responses on the NB-assisted UWB discovery channel or the UWB discovery channel. The device may establish the respective session with each of the corresponding one or more additional devices either one at a time at a given point in time or in parallel at the given point in time.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 12 shows an example table with exemplary payload content values in an ACP Frame, according to some embodiments.

Figure 1:
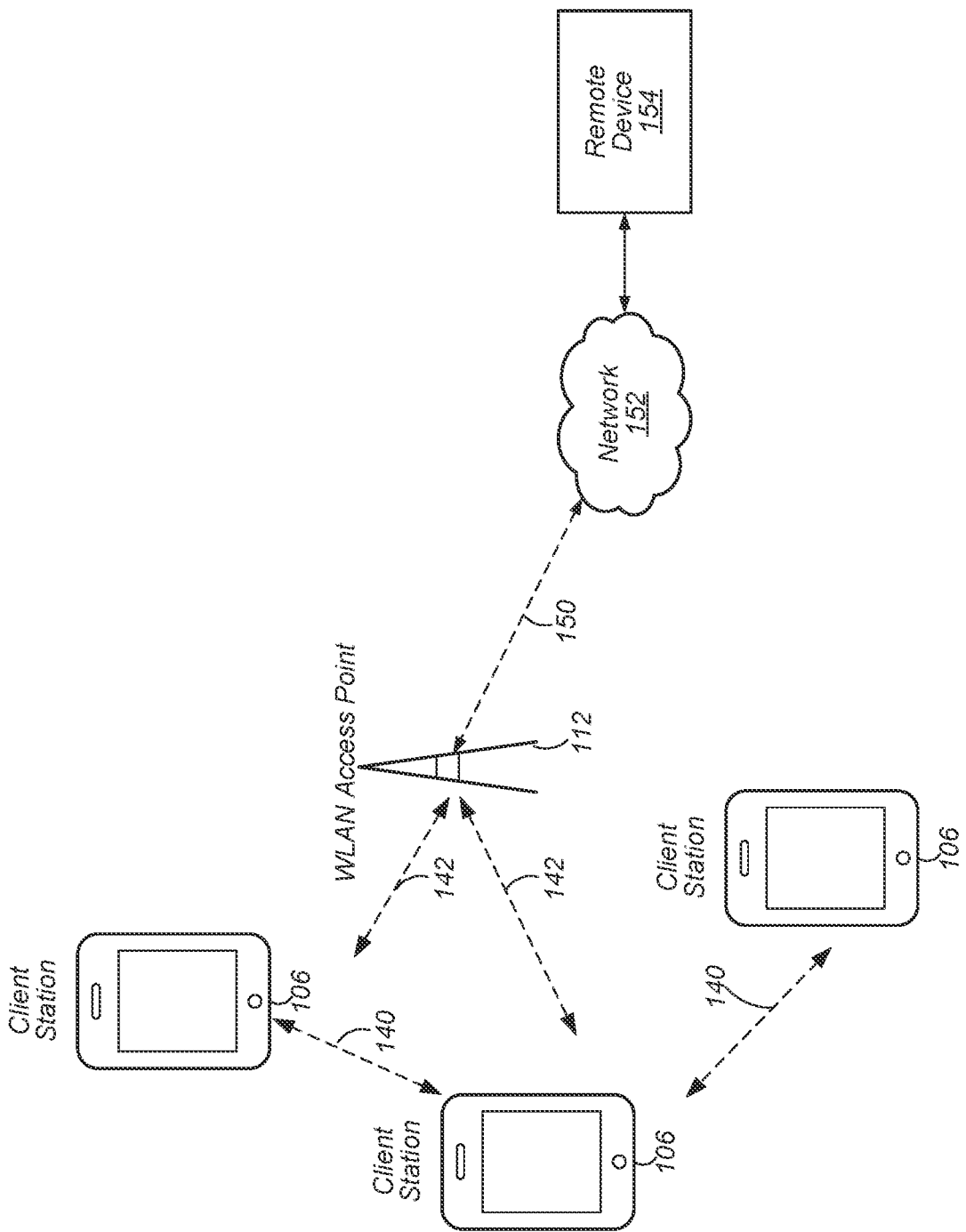
FIG. 1 illustrates an example WLAN communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
AP: Access Point
DL: Downlink (from AP to UE)
UL: Uplink (from UE to AP)
TX: Transmit/Transmission
RX: Receive/Reception
LAN: Local Area Network
WLAN: Wireless LAN
WPAN: Wireless Personal Area Network
RAT: Radio Access Technology
PE: Privacy Enhanced
BSS: Basic Service Set
UWB: Ultra-Wideband
NB: Narrowband
ACP: Acquisition Packet
TI: Transmission Interval
CAP: Contention Access Period
CFP: Contention Free Period
PLCP: Physical Layer Convergence Protocol
PSDU: PLCP Service Data Unit (Physical Layer Service Data Unit)
PHY: Physical (Layer)
BPRF: Base Pulse Repetition Frequency
HRP: High-Rate Pulse Repetition Frequency
ERDEV: Enhanced Ranging Devices
PPDU: Physical Layer Protocol Data Unit
QPSK: Quadrature Phase Shift Keying
O-QPSK: Offset-QPSK
SRC: Source

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. smart watch, smart glasses), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Processor—refers to various elements (e.g., circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation. For example, in 5G NR, the operating frequency bands are categorized in two groups. More specifically, per 3GPP Release 15, frequency bands are designated for different frequency ranges (FR) and are defined as FR1 and FR2, with FR1 encompassing the 410 MHz-7125 MHz range and FR2 encompassing the 24250 MHz-52600 MHz range.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RB s. The number of RBs within one RBG may differ depending on the system bandwidth.

Bandwidth Part (BWP)—A carrier bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Personal Hotspot—Mobile devices may have the capability of sharing their cellular link(s)—meaning communication over the cellular link(s)—and/or internet connection with other connected devices. Such mobile devices may be linked to the other devices via one of many different links, for example via a wireless local area network (Wi-Fi), over Bluetooth or via a cabled connection such as USB, just to name a few. A device that wirelessly shares its cellular link(s) and/or internet connection with other devices is oftentimes referred to as a personal hotspot (PHS; or mobile hotspot), which effectively enables the device to operate as a portable router. Personal hotspots may be protected by a PIN or password, and an Internet-connected and/or cellular capable mobile device may thereby serve as a portable wireless access point and router for other devices that are connected to it.

BLUETOOTH™— The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN/WPAN System

FIG. 1 illustrates an example WLAN/WPAN system according to some embodiments. As shown, the exemplary WLAN/WPAN system includes a plurality of wireless client stations or devices, or user equipment (UEs), 106 that may communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN/WPAN system via the network 152. For example, the remote device 154 may be another wireless client station. The WLAN/WPAN system may operate according to any of various communications standards, such as the various IEEE 802.11 and IEEE 802.15 standards. Accordingly, in addition to communicating via AP 112, wireless devices 106 may communicate directly with one or more neighboring mobile devices (e.g., via direct communication channels 140), without use of the access point 112.

In some embodiments, as further described below, a wireless device 106 may perform methods for device discovery, session setup, and maintenance for communications with other devices, for example via direct communication channel 140 according to IEEE 802.15 standards.

Figure 2:
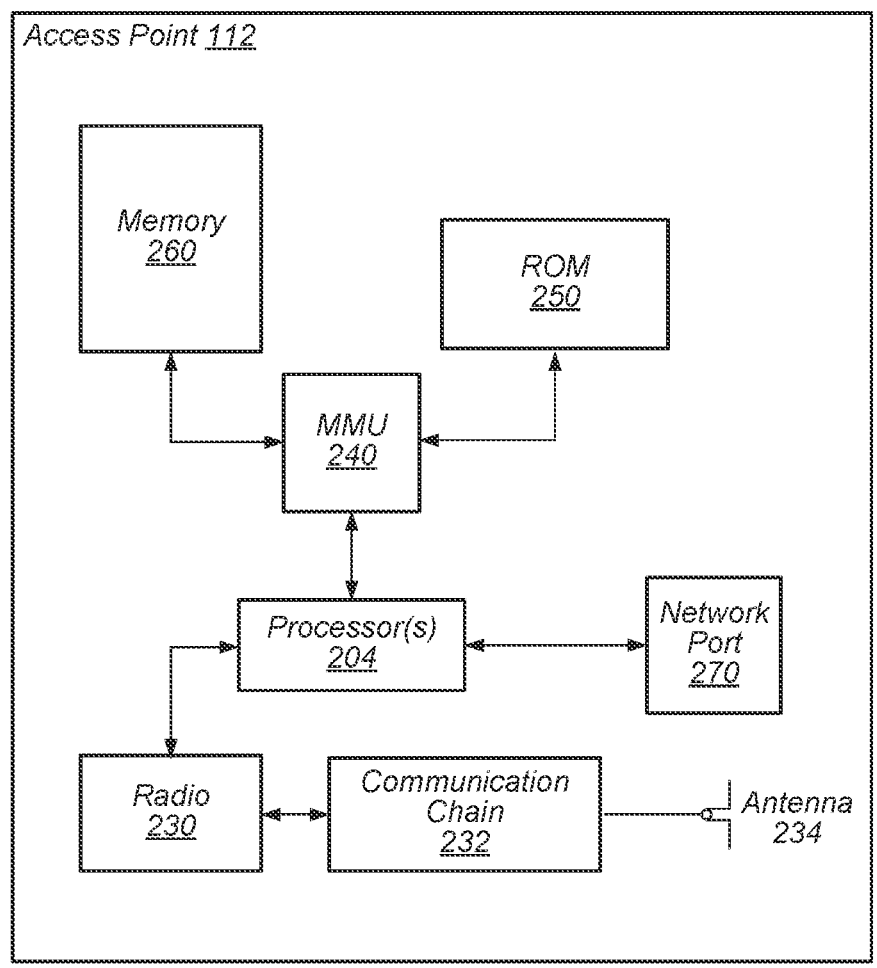
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which receive addresses from the processor(s) 204 and to translate those addresses to locations in memory (e.g., memory 260 and read only memory (ROM) 250) or to other circuits or devices.

The AP 112 may include at least one network port 270. The network port 270 may couple to a wired network and provide a plurality of devices, such as mobile devices 106, access to the Internet. For example, the network port 270 (or an additional network port) may couple to a local network, such as a home network or an enterprise network. For example, port 270 may be an Ethernet port. The local network may provide connectivity to additional networks, such as the Internet.

The AP 112 may include at least one antenna 234, which may operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may communicate via Wi-Fi or WLAN, e.g., 802.11. The wireless communication circuitry 230 may also, or alternatively, communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Figure 3A:
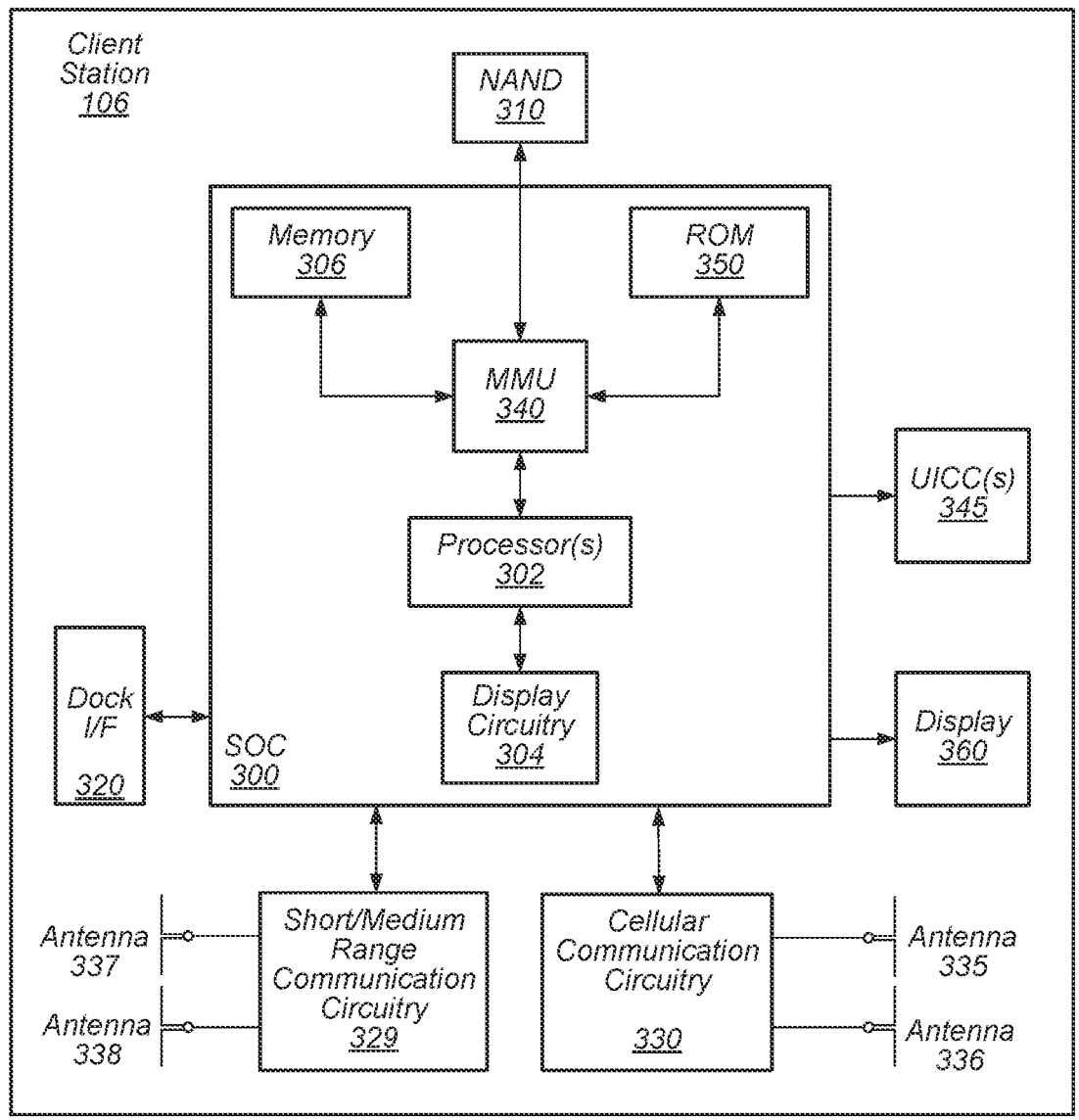
FIG. 3A illustrates an example simplified block diagram of a mobile station (UE), according to some embodiments.

FIG. 3A—Client Station Block Diagram

FIG. 3A illustrates an example simplified block diagram of a client station 106. It is noted that the block diagram of the client station of FIG. 3A is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may perform memory protection and page table translation or set up. In some embodiments, the MMU 340 may be included as a portion of the processor(s) 302.

As noted above, the client station 106 may communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may perform methods for device discovery, session setup, and maintenance for communications with other devices, for example via direct communication channels according to IEEE 802.15 standards.

As described herein, the client station 106 may include hardware and software components for implementing the features described herein. For example, the processor 302 of the client station 106 may implement part or all of the features described herein, e.g., by executing program instructions stored on a memory medium (e.g., a non-transitory computer-readable memory medium). Alternatively (or in addition), processor 302 may be a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that perform the functions of processor 302. In addition, each integrated circuit may include circuitry (e.g., first circuitry, second circuitry, etc.) to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) to perform the functions of cellular communication circuitry 330 and short-range wireless communication circuitry 329.

Figure 3B:
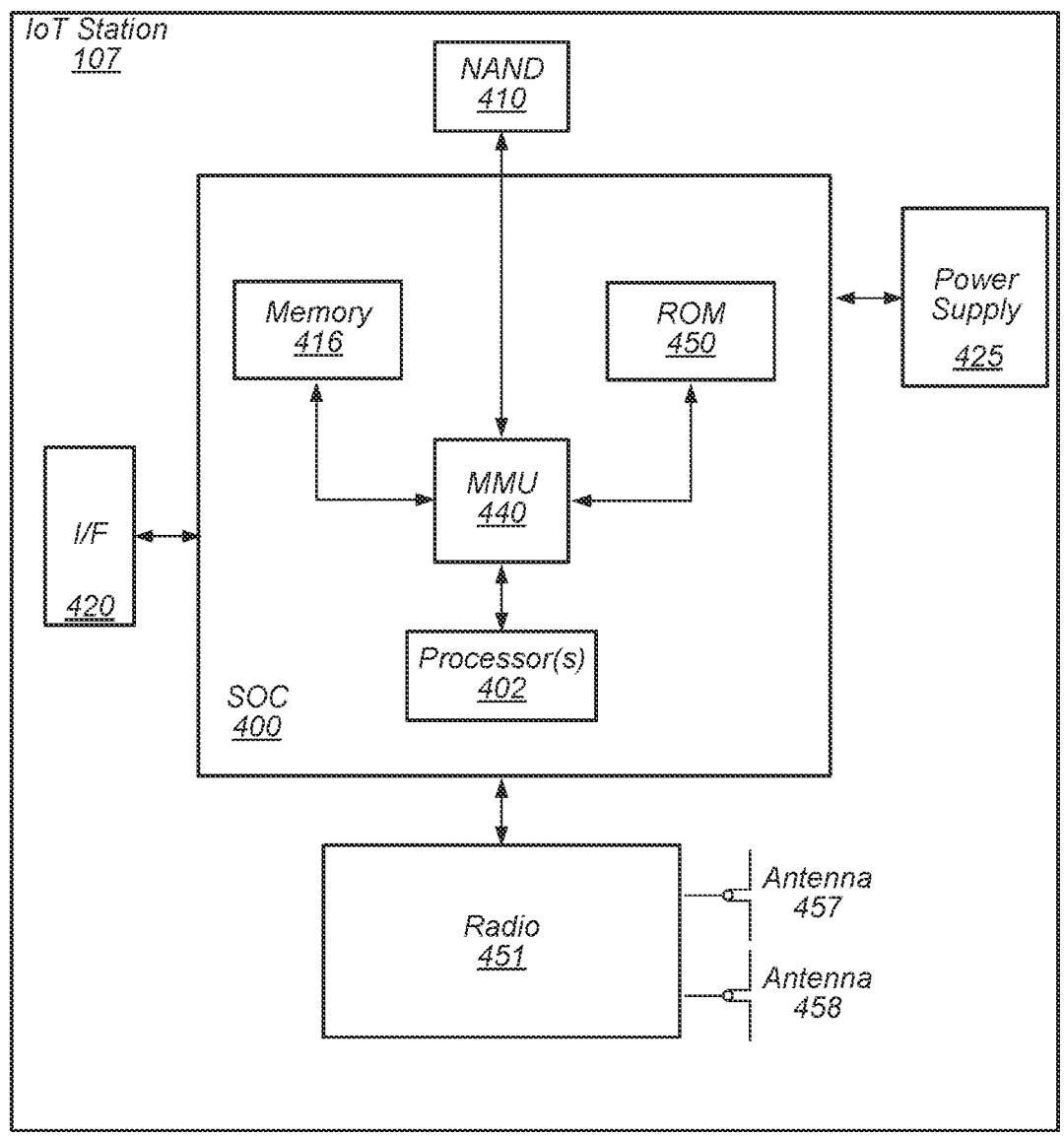
FIG. 3B illustrates an example simplified block diagram of an Internet of Things (IoT) station, according to some embodiments.

FIG. 3B: Internet of Things (IoT) Station

FIG. 3B illustrates an example simplified block diagram of an IoT station 107, according to some embodiments. According to embodiments, IoT station 107 may include a system on chip (SOC) 400, which may include one or more portions for performing one or more purposes (or functions or operations). The SOC 400 may be coupled to one or more other circuits of the IoT station 107. For example, the IoT station 107 may include various types of memory (e.g., including NAND flash 410), a connector interface (I/F) 420 (e.g., for coupling to a computer system, dock, charging station, light (e.g., for visual output), speaker (e.g., for audible output), etc.), a power supply 425 (which may be non-removable, removable and replaceable, and/or rechargeable), and communication circuitry (radio) 451 (e.g., BT/BLE and/or WLAN).

The IoT station 107 may include at least one antenna, and in some embodiments, multiple antennas 457 and 458, for performing wireless communication with a companion device (e.g., client station 106, AP 112, and so forth) as well as other wireless devices (e.g., client station 106, AP 112, other IoT stations 107, and so forth). In some embodiments, one or more antennas may be dedicated for use with a single radio and/or radio protocol. In some other embodiments, one or more antennas may be shared across two or more radios and/or radio protocols. The wireless communication circuitry 451 may include WLAN logic and/or WPAN logic, such as BT/BLE logic, for example. In some embodiments, the wireless communication circuitry 451 may include multiple receive chains and/or multiple transmit chains for receiving and/or transmitting multiple spatial streams, such as in a multiple-input multiple output (MIMO) configuration.

As shown, the SOC 400 may include processor(s) 402, which may execute program instructions for the IoT station 107. The processor(s) 402 may also be coupled (directly or indirectly) to memory management unit (MMU) 440, which may receive addresses from the processor(s) 402 and translate those addresses into locations in memory (e.g., memory 416, read only memory (ROM) 450, NAND flash memory 410) and/or to other circuits or devices, such as the wireless communication circuitry 451. The MMU 440 may perform memory protection and page table translation or set up. In some embodiments, the MMU 440 may be included as a portion of the processor(s) 402.

As noted above, the IoT station 107 may be configured to communicate wirelessly with one or more neighboring wireless devices. In some embodiments, as further described below, IoT station 107 may perform methods for device discovery, session setup, and maintenance for communications with other devices, for example via direct communication channels according to IEEE 802.15 standards.

Device Discovery, Session Setup, and Maintenance

As previously mentioned, most UWB transceivers rely on BLE for device discovery, UWB session setup and maintenance. For example, a digital car key may establish a BLUETOOTH™ connection with a car, which may also bootstrap the UWB connection. In other words, BLUETOOTH™ is always available during session management, and UWB is a special purpose radio oftentimes used for the purpose of determining proximity. However, usage of BLUETOOTH™ for discovery and new organization has certain drawbacks.

Specifically, within a BLE-UWB device (e.g., a device with both BLUETOOTH™ and UWB communication capability), the BLE and UWB interfaces communicate through the application processor. Therefore, when the BLUETOOTH™ (BLE) and UWB interfaces communicate with each other, they always have to wait for the application processor. This increases latency in communication between the two interfaces and increases the power consumption of the device—e.g., waking up the application processor consumes large amounts of power—leading to shorter battery life.

In order to address the aforementioned issues, a narrowband (NB) radio may be used. In some embodiments, a NB radio may be a 2.5 MHz channel operating in different regulatory regions. The NB radio may be very tightly coupled with the UWB radio, for example sourced based on a single crystal. In other words, both the NB and UWB radios may be driven by the same time source. This may enable leveraged use of ACP (Acquisition Packet) for discovery, session setup, and maintenance over UWB and/or NB (Narrowband).

Rules for advertising ACP and scanning for ACP may be defined for two modes of operation. A first mode of operation referred to as ad-hoc discovery and a second mode of operation referred to as managed discovery. The IEEE 802.15.4ab standard is currently working on defining a next generation of standalone UWB and NB assisted UWB transceivers. One goal is to divorce the UWB standalone transceivers and NB-assisted UWB transceivers from BLE usage.

Modes for Discovery and Session Setup

Pursuant to the above, at least two different modes of operation may be implemented for discovery and session setup over UWB and/or NB assisted UWB without reliance on BLE.

In a first mode of operation, referred to as ad-hoc mode, a first device may discover a second device and may perform session setup. The first and second device may both be specifically triggered to execute discovery and session setup. The trigger may be an external trigger, for example a user input, or any other type of predefined trigger specifically intended to trigger discovery and session setup for the devices.

In a second mode of operation, referred to as managed mode, a first device may discover a second device and may perform a session set up. Unlike in the first mode of operation, however, the first device may continuously perform discovery of other devices as opposed to performing individual discovery operations in response to a respective external trigger (for each discovery operation). This may prove advantageous when the first device is powered from a wall outlet or other non-consumable power source, whereby power consumption is not an important consideration. For example, the first device may be running discovery as a background process, e.g., it may not perform discovery and setup in response to any specific or special external input unlike in ad-hoc mode. Once a new device is detected, the first device may perform session setup with that new device. The first device may also perform session maintenance with other devices within effective communication range with which it has previously already established a session. Again, this may be an ongoing process without regard to power consumption. The other devices may have been triggered to participate in a sessions setup once they have detected the first device.

First Mode of Operation: Ad-Hoc Mode—Peer-to-Peer Acquisition and Session Setup

Figure 4:
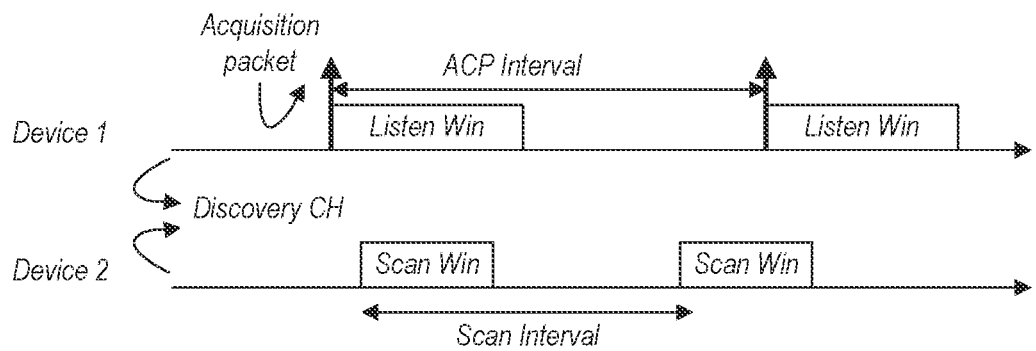
FIG. 4 shows an example signaling diagram for a peer-to-peer ad-hoc mode acquisition and session setup over UWB and/or NB, according to some embodiments.

FIG. 4 shows a signaling diagram for a peer-to-peer ad-hoc mode acquisition and session setup over UWB and/or NB, according to some embodiments. As shown in FIG. 4, device 1 (e.g., mobile phone or home pod station, etc.) and device 2 (e.g., a location indicator tag, etc.) may be involved in the acquisition and session setup. When acquisition is triggered on device 1, device 1 may periodically transmit an Acquisition Packet (ACP) announcing its presence. The ACP interval is the period during which device 1 transmits the ACP. When acquisition is triggered on device 2, device 2 may periodically scan the discovery channel (CH) to detect or hear the ACP transmitted by device 1 within a scan window (Scan Win) time period. Device 1 then listens for feedback from discovered devices within a listen window (Listen Win) time period during the ACP interval. The communication may all take place on an UWB and/or NB discovery channel known a priori by both devices. Rendezvous between device 1 and device 2 may occur when device 2 detects the ACP transmitted by device 1. Device 2 may then transmit an ACP response to device 1 within a specified time period following detection of the ACP. Device 1 may receive the first session setup packet sent by device 2, and device 1 and device 2 may remain on the discovery channel until session setup exchanges (e.g., the exchange of session setup messages) on the discovery channel are complete or a specified timeout occurs. ACP and scanning behavior may not occur during the session setup exchanges. After setup completion, device 1 and device 2 may cease all acquisition behavior, e.g., device 1 may stop transmitting ACPs and device 2 may stop scanning for ACPs.

In some embodiments, the ACP may be transmitted over the NB radio on an NB discovery channel, or it may be transmitted on the UWB radio on a UWB discovery channel. As shown in FIG. 4, device 1 is the effective controller and device 2 is the effective controlee, but either device may operate as a controller or controlee in ad-hoc mode of operation.

Ad-Hoc Mode: Peer to Many Peer Acquisition and Setup

Figure 5:
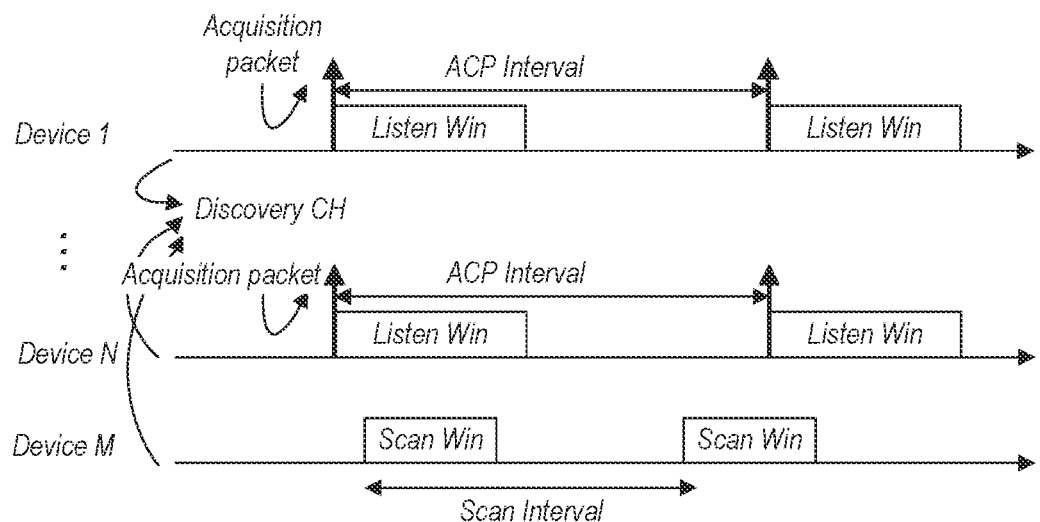
FIG. 5 shows an example signaling diagram for a peer-to-many-peer ad-hoc mode acquisition and session setup over UWB and/or NB, according to some embodiments.

FIG. 5 shows a signaling diagram for a peer-to-many-peer ad-hoc mode acquisition and session setup over UWB and/or NB, according to some embodiments. As illustrated in FIG. 5, multiple devices, device 1 to device N, may be transmitting ACPs on a NB or UWB discovery channel. Device M may therefore detect ACPs from multiple peer devices. In other words, while the multiple peer devices (device 1 to device N) are transmitting ACPs, device M may detect one or more of those ACPs. Device M then perform serial setup or parallel setup with the multiple peer devices. During serial setup, device M may perform setup with one other peer device at a point in time. During parallel setup, device M may perform setup with multiple peer devices in parallel at a point in time. In other words, device M may either communicate with one peer device at a time for the purpose of a session setup or it may communicate with multiple peer devices in parallel for the purpose of setting up each respective session with the corresponding peer devices. The acquisition and setup sequence between a pair of devices (e.g., between device 1 and device M and/or between device N and device M, etc.) may be the same as in the peer-to-peer case (e.g., in the use of the listening window and scanning window, etc.)

Ad-Hoc Mode: Session Maintenance

Once acquisition and setup have completed, for example between device 1 and device 2 (in reference to FIG. 4) and/or between devices 1 to N and device M (in reference to FIG. 5), the acquisition mechanism and packet transmission may be halted. The session may be subsequently maintained by leveraging off of the live session established between the connected devices. A live session may be a ranging session, for example. In order to maintain the session, updates to information and/or parameters used by the devices to maintain the live session may be transmitted during the live session. In other words, session maintenance exchanges may be performed during the live session. For example, a ranging session may be simultaneously used to also update any parameter(s) associated with that ranging session.

Managed Mode: Peer to Peer Acquisition and Setup

Figure 6:
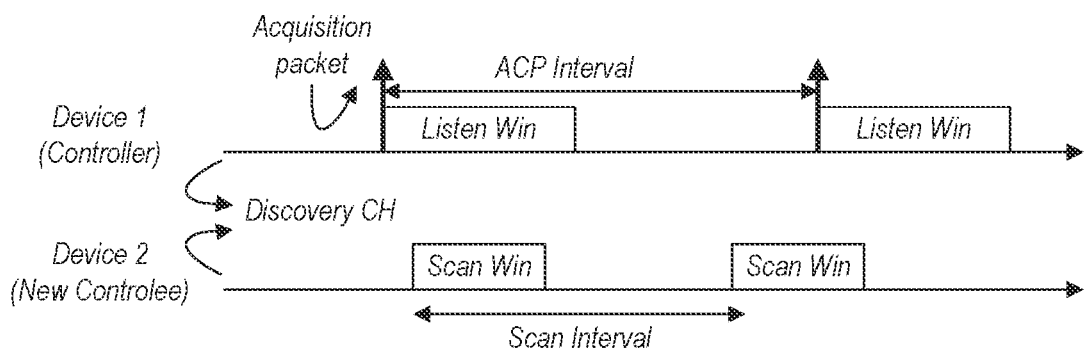
FIG. 6 shows an example signaling diagram for a peer-to-peer managed mode acquisition and session setup over UWB and/or NB, according to some embodiments.

FIG. 6 shows a signaling diagram for a peer-to-peer managed mode acquisition and session setup over UWB and/or NB, according to some embodiments. In managed mode, acquisition may be an ongoing activity performed by the device, for example as a background process. The device may be continually scanning or searching for other devices, and/or may be sending out ACPs. The device that performs this continuous scanning is referred to as the controller device, or controller for short. For example, as seen in FIG. 6, device 1 may operate as the controller, which periodically sends ACPs for purposes of coordinating UWB channel usage with other devices. In effect, device 1 is indicating to surrounding devices (some or all of which may be within effective communication range of device 1) how device 1 is consuming the UWB resource(s). Additionally, the ACPs transmitted by device 1 may also act as a beacon indicating the presence of device 1 to the surrounding devices. Furthermore, as previously mentioned with regard to the ad-hoc mode of operation, and as also illustrated in FIG. 6, an ACP may be transmitted over an ACP interval and device 1 (the controller) may listen for any responses to those transmitted ACPs.

Accordingly, in some embodiments, when acquisition is triggered on device 2 (the new controlee device, or controlee for short) may periodically scan to detect the ACP transmitted by device 1. Rendezvous between device 1 and device 2 completes after device 2 detects the ACP transmitted by device 1, and device 1 detects a first session setup packet transmitted by device 2. Device 1 and device 2 may remain on the discovery channel until session setup exchanges are complete or a timeout occurs. Again, ACP and scanning behavior are not executed during session setup exchanges. After setup completion, device 2 may cease the acquisition behavior and may stop scanning for ACPs. However, device 1 may continue to transmit ACPs, which may be received by other devices (controlees), for example, as those devices appear within effective communication range of device 1. In the managed mode of operation, the ACP interval (or length of the ACP interval) may be dynamic, e.g., it may vary depending on one or more factors and/or parameters. That is, the ACP interval may be reduced or increased as dictated by necessity and/or as desired. For example, if device 1 detects an external trigger initiating a discovery operation, the ACP interval may be reduced, and if device 1 (the controller) determines that the discovery is complete, it may increase the ACP interval.

Controller Advertisement Session Overview

Figure 7:
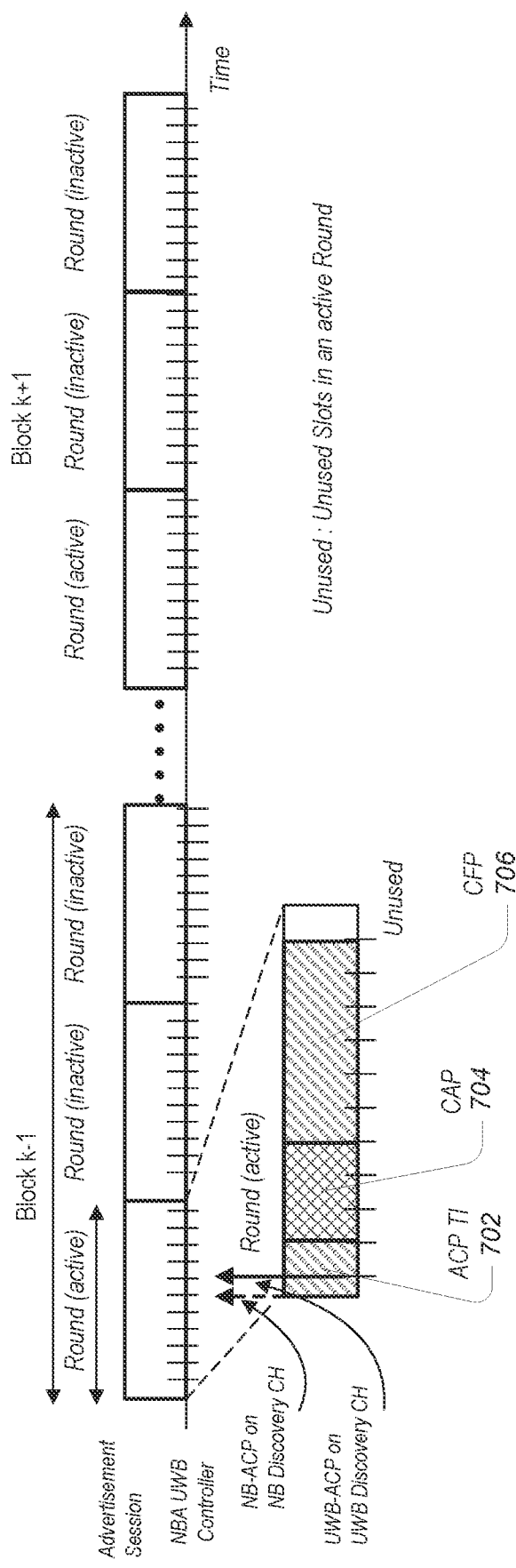
FIG. 7 illustrates an example ACP advertisement session of a controller device, according to some embodiments.

FIG. 7 illustrates the ACP advertisement session of a controller device, according to some embodiments. The controller (device) may advertise itself periodically over an UWB discovery channel or an NB discovery channel. The NB-assisted UWB channel may thereby conduct an ongoing advertisement session divided into blocks, which may be divided into rounds, as shown in FIG. 7. At least one of the rounds may be an active round, as also shown in FIG. 7. An active round may include multiple slots, and transmission of packets may take place within those slots, e.g., per the IEEE 802.15 standard. For an advertisement session, which may be considered a special session within an active round, there may a number of different markings. The first few slots may be grouped and categorized as an ACP transmission interval (TI), indicated as ACP TI 702 in FIG. 7. The ACP TI may be followed by a first set of slots collectively categorized as a contention access period (CAP), indicated as CAP 704 in FIG. 7, followed by a second set of slots collectively characterized as a contention free period (CFP), indicated as CFP 706 in FIG. 7. The active round may also include one or more unused slots. Each of these groups of slots may be associated with a predefined behavior. ACPs may be transmitted in (or during) the ACP TI on either an NB or a UWB discovery channel. In (or during) the CAP, the controller may be expected to be operating within its listen window, listening for response to its transmitted ACPs. Further during the CAP, the controlees (devices) connecting to the controller (device) may transmit an ACP response to the controller (e.g., a "hello" message), while devices already connected to the controller may transmit session maintenance information/packets to the controller. Overall, the CAP may be considered a time period during which the controlees may transmit to the controller. Once the CAP expires, the controller may initiate further communications during the CFP. For example, it may engage in a session setup exchange with a new controlee(s) by way of many request/response messages, all originating from the controller. Alternatively, in (or during) the CAP, the controller may engage in a call response exchange for the purposes of session maintenance with existing devices connected to the controller. A minimum length for the ACP TI and CAP may be determined based on time requirements for successful transmission of ACPs and successful response by new controlees, respectively.

In some embodiments, the NB-ACP may provide an offset to a UWB-ACP transmission (TX). This may offer UWB Receive (RX) scan window optimization at the controlee. Accordingly, during the ACP TI the controller may transmit NB-ACPs on an NB discovery channel and UWB-ACPs on a UWB discovery channel. The ACP may indicate the CAP duration and CFP duration (e.g., indicate the number of slots occupied by each), while also indicating a respective start slot index for the CAP period and for the CFP period. The minimum length for the CFP and/or the CAP may be zero.

ACP TI (Acquisition Packet Transmission Interval)

Referring again to FIG. 7, the UWB-ACP may carry the round composition, or information about the composition of the active round. Optionally, the NB-ACP may carry the round composition. For the receivers to identify the length of the different (time) periods (e.g., ACP TI, CAP, CFP), corresponding information may be advertised during transmission in either the NB discovery channel (NB ACP on NB discovery channel) or the UWB discovery channel (UWB-ACP on UWB discovery channel.) NB-ACP offers extended range discovery and connection setup relative to UWB-ACP. More than one NB-ACP and UWB-ACP may be allowed to be transmitted in or during the ACP TI. By default, all exchanges in or during the CAP and the CFP may occur over the UWB discovery channel unless the NB-ACP indicates that 'extended range discovery and connection setup' is enabled. If extended range discover and connection setup is enabled, all exchanges in the CAP and the CFP may occur over the NB discovery channel. The reason for this is that narrowband has a longer coverage range relative to UWB, therefore, use of narrow band radio may be preferred for long-range discovery.

CAP (Contention Access Period)

Figure 8:
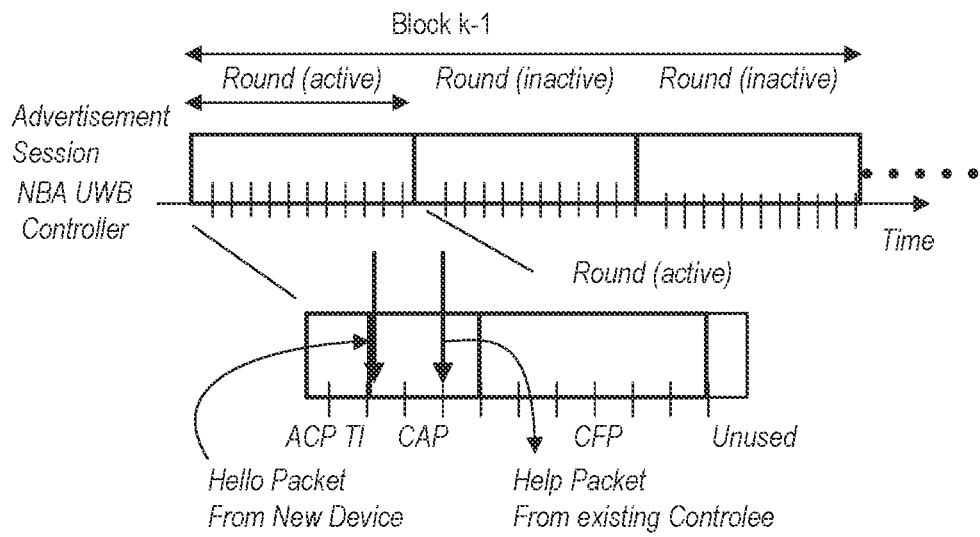
FIG. 8 shows an example signaling diagram illustrating signaling in the CAP during a peer-to-peer managed mode acquisition and session setup over UWB and/or NB, according to some embodiments.

FIG. 8 shows a signaling diagram illustrating signaling in the CAP during a peer-to-peer managed mode acquisition and session setup over UWB and/or NB, according to some embodiments. As previously mentioned, the CAP corresponds to the listen window with respect to the controller, within which the controller listens (or monitors) for acquisition responses from new controlees or existing controlees. In the case of multiple existing controlees, a mechanism may be implemented to determine which controlee responds in the first slot within the CAP, or more generally, in what manner the controlees respond within the CAP. In some embodiments, a contention-based mechanism may be implemented. The multiple controlees that wish to communicate with the controller may each randomly choose a value between a minimum CAP value and a maximum CAP value, then transmit their respective packets accordingly, with the expectation that the packet will reach the controller. For example, if the controller indicates in the ACP that the CAP slot count is a specified number (e.g., 10), each given controlee that intends to communicate with the controller may randomly choose a value between 1 and the specified number (in this case 10) that would correspond to the slot in the CAP during which the given controlee would transmit packets to the controller, e.g., transmit an acquisition response packet (such as a "hello" packet) to the controller.

Pursuant to the above, a new device (controlee) may be said to contend for a slot to transmit an ACP response packet (e.g., "Hello" Packet) to the controller. Other session packets (e.g., Help/Hello packets) may be transmitted on the UWB discovery channel upon detecting the UWB-ACP. In some embodiments, those packets may be transmitted on the NB discovery channels, in case the new device/controlee is NB capable, and the new device detects the NB-ACP with the 'extended range discovery and connection setup' enabled for the new device. The session packets (e.g., Hello/Help packets) may be of a BPRF data packet format when transmitted on the UWB discovery channel, or they may of an O-QPSK packet format when transmitted on the NB discovery channel.

CFP (Contention Free Period)

Figure 9:
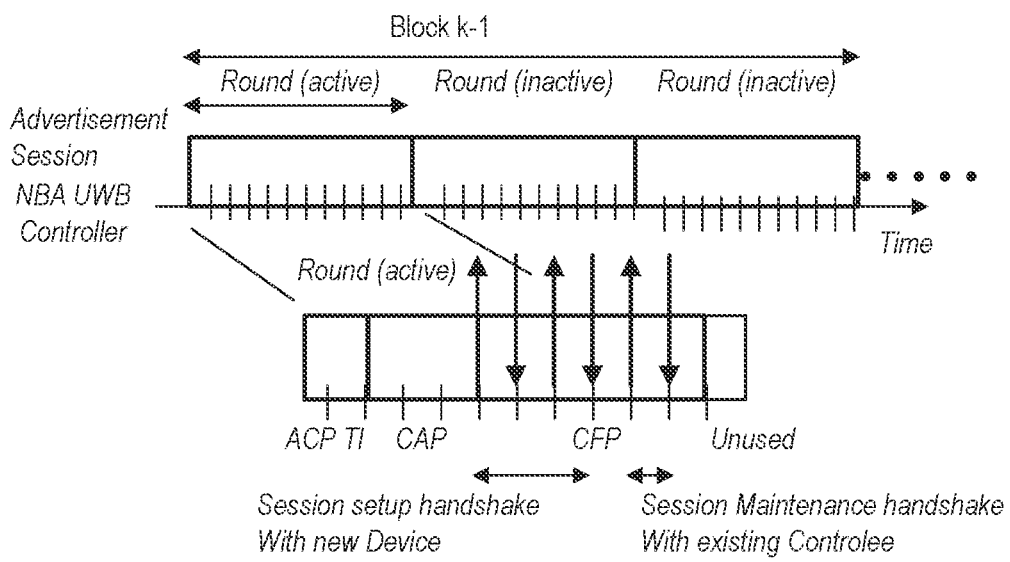
FIG. 9 shows an example signaling diagram illustrating signaling in the CFP during a peer-to-peer managed mode acquisition and session setup over UWB and/or NB, according to some embodiments.

FIG. 9 shows a signaling diagram illustrating signaling in the CFP during a peer-to-peer managed mode acquisition and session setup over UWB and/or NB, according to some embodiments. As previously mentioned, the acquisition, setup and maintenance operations may use a handshake procedure/mechanism initiated by the controller. The handshake may be with a new controlee (new device) for purposes of a session setup, or with existing controlees for purposes of session maintenance (which may include updating certain parameters associated with the communication session, for example). Similar to response packets transmitted during the CAP, session maintenance packet transmitted during the CFP have a preferred format of BPRF when transmitted over a UWB channel and a preferred format of O-QPSK when transmitted over an NB channel.

Accordingly, transmission of setup request and setup response packets may be transmitted as a controller performs a session setup handshake with a new device from which it received an acquisition response packet (e.g., "Hello" packet), as indicated by the first four arrows in the CFP in FIG. 9. Similarly, maintenance request and maintenance response packets may be transmitted as the controller performs session maintenance handshake with an existing controlee from which it has received a request packet (e.g., a "Help" packet), as indicated by the last two arrows in the CFP in FIG. 9. The ACP may indicate controlee IDs that may be solicited for session maintenance in or during the CFP.

Properties of ACP/Hello/Help/Setup/Maintenance Request—Response Packets

Figure 10:
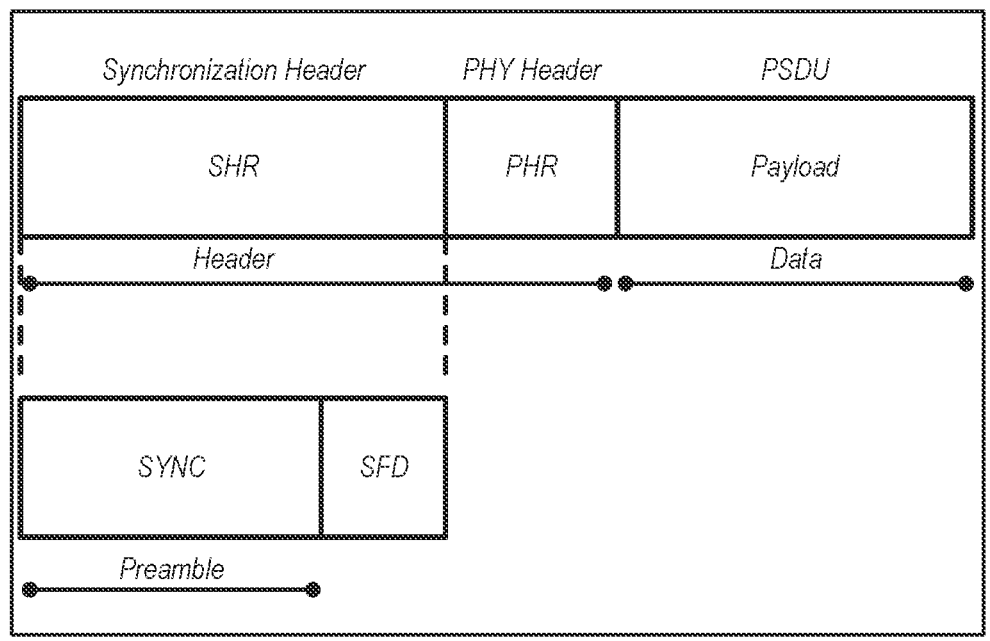
FIG. 10 shows an example diagram illustrating the structure of session packets, according to some embodiments.

FIG. 10 shows a diagram illustrating the structure of session packets, according to some embodiments. The header portion of the packet may include a synchronization header (SHR) and physical layer (PHY) header (PHR). The data portion of the packet may include the payload (PSDU). The source (SRC) MAC address in the MAC Header in the PSDU may be used by the controller to identify where the received packets (e.g., "Hello" packets and "Help" packets) are sent from. The payload for setup request and setup response may originate from the application layers, and the packets may encapsulate any setup related info. That is, setup messages may be encapsulating data/information provided by the operating system. Payload for maintenance request and maintenance response packets coming from an upper layer may encapsulate any maintenance related information. That is, payload provided from an upper layer may be encapsulated according to a link layer structure, e.g., SHR, PHR, etc.) When sent over a UWB discovery channel, the packet may preferably be of a BPRF Data Packet format (e.g., STS Packet Config 0, HRP ERDEV PPDU). When sent over an NB discovery channel, the packet may preferably be of a O-QPSK packet format (e.g., 250 Kbps modulated).

Content of NB/UWB ACP

Figure 11:
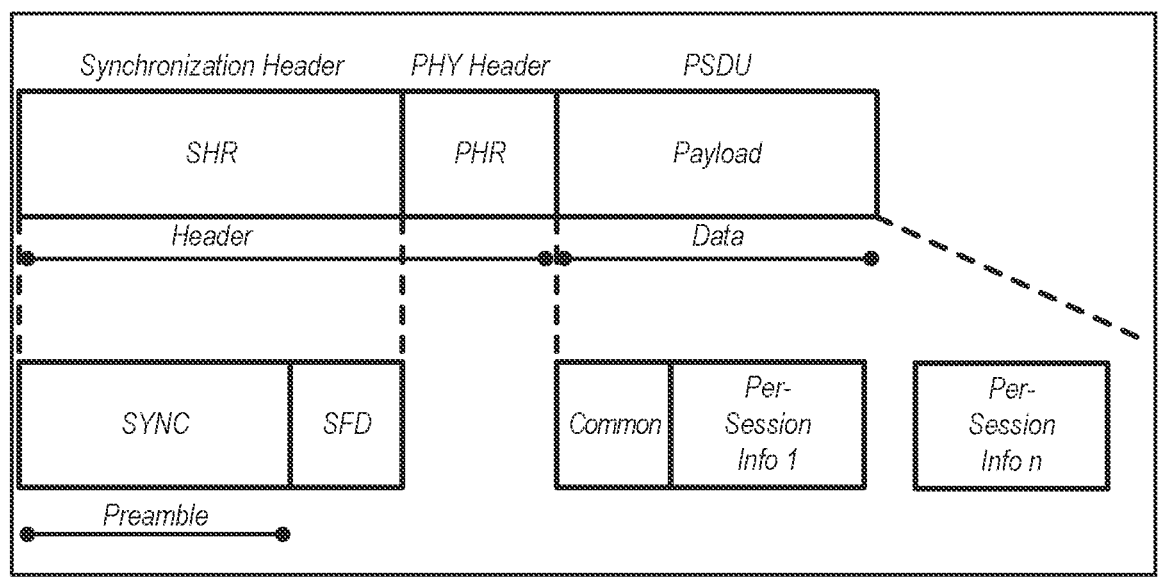
FIG. 11 shows an example diagram illustrating the structure and content of NB and UWB acquisition packets, according to some embodiments.

FIG. 11 shows a diagram illustrating the structure and content of NB and UWB acquisition packets, according to some embodiments. As previously mentioned, in managed mode the ACP transmitted by the controller may provide an indication (e.g., via information pertaining to resource usage of the UWB) of how the UWB is being utilized or consumed by the controller. That information may be used to indicate to surrounding devices that the UWB channel is in use and should not be used by the surrounding devices at that time. The advertisement session may also indicate the frequency or rate or time frame(s) associated with when the ACP is transmitted (or is occurring). This may allow controlees to determine when a next ACP may occur or is expected to be transmitted. The information structure may be such that the payload of the ACP may include common information applicable to all occurring sessions associated with the controller, as indicated by the "Common" section of the Payload shown in FIG. 11. Alternately or in addition, the ACP may include per-session information individually for each session associated with the controller, as indicated by the "Per-Session" sections of the Payload shown in FIG. 11 (Per-Session info 1 to Per-Session info n.) Advertisement is one example of a session, other examples may include data streaming, sensing, ranging, etc.

The common field may indicate information such as the number of per-session information being advertised in the ACP. The advertisement session description may be one such "per-session info". Overall, the controller may advertise to neighboring controlees information about other ongoing sessions of the controller, to make the controlees aware of the controller's UWB resource usage pattern, thereby leading to better coexistence. The payload may also be carried in an NB-ACP.

Example of ACP Frame Payload Content

FIG. 12 shows a table with exemplary payload content values in an ACP Frame, according to some embodiments. More specifically, the table provides exemplary parameters in the common information field and per-session info fields, including the number of per-session info fields indicated in the common info field, and various parameters such as next block interval, next round interval, block index, hop mode, round index, block duration, round duration, slot duration, etc. in the per-session info fields.

Example of Advertisement Session

Figure 13:
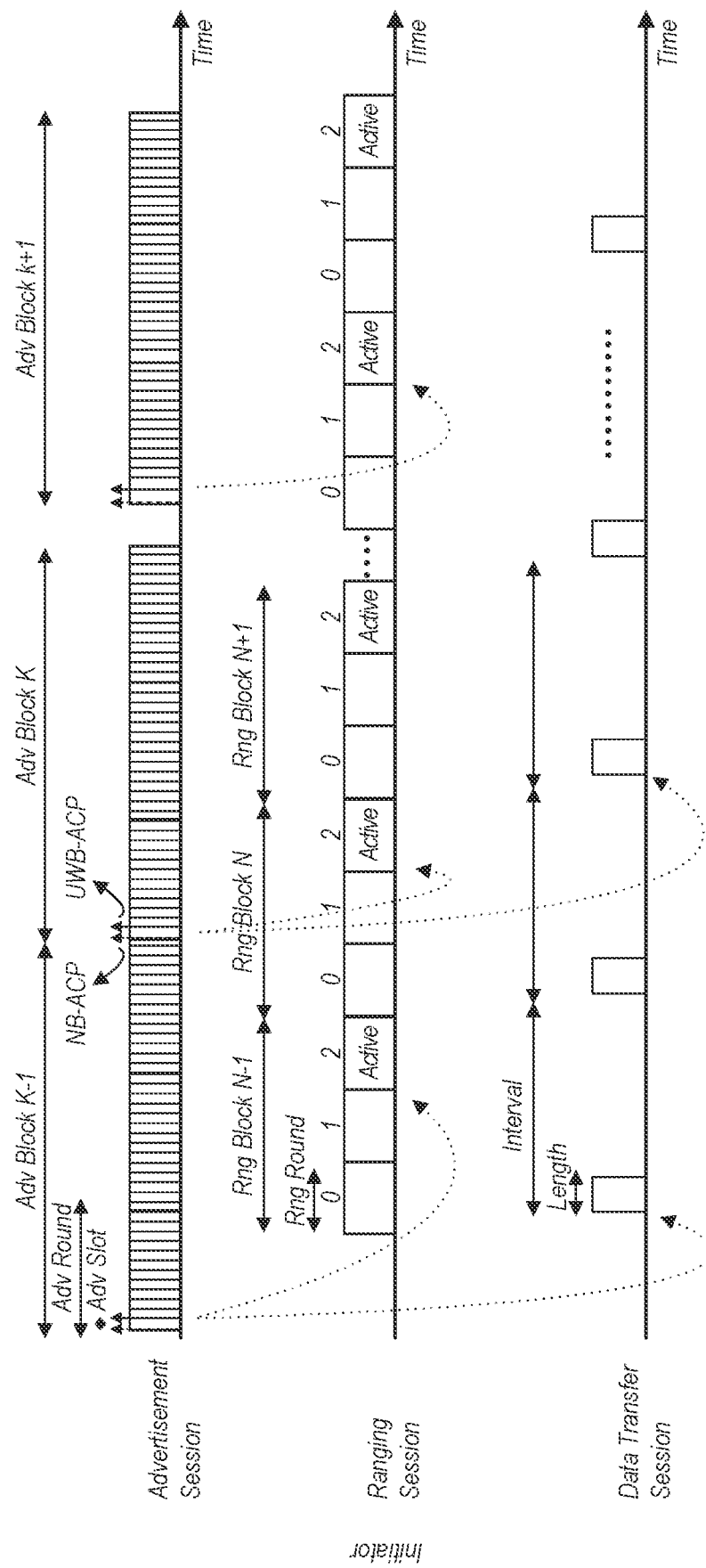
FIG. 13 shows an example timing diagram illustrating an example of an advertisement session, according to some embodiments.

FIG. 13 shows a timing diagram illustrating an example of an advertisement session, according to some embodiments. The advertisement session priority may be configurable. In case of NB/UWB resource collision, the NB/UWB interface may be made available to a session, per its priority configuration. The initiator may execute one Advertisement session and zero or more Ranging and/or Data Transfer sessions. The Advertisement session may use the NB and UWB interface, while Ranging and Data Transfer sessions may use the NB and/or UWB interface. The NB-ACP in the Advertisement session may provide information indicating UWB-ACP occurrence(s). The UWB-ACP in the Advertisement session may provide information indicative of other (ongoing) session(s) of the advertising device (controller). The Advertisement session may be used for NB Discovery and Connection Setup.

As also illustrated in FIG. 13, in some embodiments, a controller may be running multiple sessions at the same time. For example, the controller device may be running a Ranging session (e.g., proximity measurement) while also running (in parallel) a Data Transfer session over UWB with another device, while also running the Advertisement session (discovery and setup) in parallel. The Advertisement session may provide an indication to surrounding devices that the controller device has two other sessions ongoing on the UWB resource(s), so the surrounding devices do not attempt to use the UWB resource(s). This may help reduce collisions and increase UWB communication efficiency when multiple devices are operating within effective communication range of each other.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to:
cause a device to transmit, over a narrowband (NB) assisted ultra-wideband (UWB) discovery channel or over a UWB discovery channel, an acquisition packet (ACP) during an ACP interval, wherein the ACP indicates the presence of the device and provides information indicating UWB channel usage of the device;
cause the device to monitor the NB-assisted UWB discovery channel or the UWB discovery channel for an ACP response from a second device responsive to the transmitted ACP;
cause the device to establish a session with the second device responsive to receiving, from the second device, the ACP response on the NB-assisted UWB discovery channel or the UWB discovery channel; and
cause the device to receive a first session packet from the second device, subsequent to receiving the ACP response.

2. The apparatus of claim 1, wherein the processor is further configured to:
cause the device to receive the ACP response within a specified time period following transmission of the ACP.

3. The apparatus of claim 1, wherein the processor is further configured to:
cause the device to remain on the NB-assisted UWB discovery channel or the UWB discovery channel until a session setup exchange with the second device has completed or until a timeout occurs.

4. The apparatus of claim 1, wherein the processor is further configured to:
cause the device to cease acquisition operation upon establishment of the session with the second device.

5. The apparatus of claim 1, wherein the processor is further configured to:
cause the device to transmit the ACP responsive to a received trigger input.

6. The apparatus of claim 1, wherein the processor is further configured to:
cause the device to transmit, subsequent to establishing the session with the second device, an update to be used by the second device to maintain the session.

7. The apparatus of claim 1, wherein the processor is further configured to:
cause the device to periodically transmit an ACP.

8. The apparatus of claim 7, wherein the processor is further configured to:
cause the device to execute a background process for periodically transmitting the ACP.

9. The apparatus of claim 7, wherein the processor is further configured to:
cause the device, for periodically transmitting the ACP, to dynamically adjust an ACP interval length between transmission of a first ACP and a second ACP.

10. A device comprising:
radio circuitry configured to transmit and receive signals for wireless communications of the device; and
a processor communicatively coupled to the radio circuitry and configured to:
interoperate with the radio circuitry to transmit, over a narrowband (NB) assisted ultra-wideband (UWB) discovery channel or over a UWB discovery channel, an acquisition packet (ACP) during an ACP interval, wherein the ACP indicates the presence of the device and provides information indicating UWB channel usage of the device;
interoperate with the radio circuitry to monitor the NB-assisted UWB discovery channel or the UWB discovery channel for an ACP response from a second device responsive to the transmitted ACP; and
interoperate with the radio circuitry to establish a session with the second device responsive to receiving, from the second device, the ACP response on the NB-assisted UWB discovery channel or the UWB discovery channel; and
interoperate with the radio circuitry to receive a first session packet from the second device, subsequent to receiving the ACP response.

11. The device of claim 10, wherein the processor is further configured to:
cause the device to transmit the ACP during an active round of an advertisement session, wherein the ACP comprises information about a composition of the active round.

12. The device of claim 11, wherein the active round comprises:
the ACP interval;
a contention access period (CAP); and
a contention free period (CFP).

13. The device of claim 12, wherein the processor is further configured to:
cause the device to receive the ACP response within the CAP.

14. The device of claim 12, wherein the processor is further configured to:
cause the device to transmit and receive a session maintenance handshake packet or a session setup handshake packet during the CFP.

15. The device of claim 12, wherein a minimum length of the ACP interval and the CAP are at least sufficient for successful transmission of the ACP and successful reception of the ACP response.

16. The device of claim 10, wherein the ACP comprises at least one of:
common session information corresponding to all sessions conducted by the device; or
an item of respective per-session information corresponding to an individual session conducted by the device.

17. A non-transitory memory element storing instructions executable by a process to:
cause a device to detect, over a narrowband (NB) assisted ultra-wideband (UWB) discovery channel or over a UWB discovery channel, an acquisition packet (ACP) during an ACP interval, wherein the ACP indicates the presence of a corresponding device and provides information indicating UWB channel usage of the corresponding device;
cause the device to transmit an ACP response, on the NB-assisted UWB discovery channel or the UWB discovery channel, to the corresponding device in response to detecting the ACP; and
cause the device to establish a session with the corresponding device, subsequent to transmitting the ACP response; and
cause the device to transmit a first session packet to the corresponding device, subsequent to transmitting the ACP response.

18. The non-transitory memory element of claim 17, wherein the instructions are further executable by the processor to:
cause the device to detect, over the narrowband (NB) assisted ultra-wideband (UWB) discovery channel or over the UWB discovery channel, one or more additional ACPs from corresponding one or more additional devices;
cause the device to transmit, responsive to detecting the additional one or more ACPs, a respective ACP response to each of the corresponding one or more additional devices on the NB-assisted UWB discovery channel or the UWB discovery channel; and
cause the device to establish a respective session with at least one of the corresponding one or more additional devices subsequent to transmitting the respective ACP response.

19. The non-transitory memory element of claim 18, wherein the instructions are further executable by the processor to:
cause the device to establish the respective session with the at least one of the corresponding one or more additional devices at a determined point in time.

20. The non-transitory memory element of claim 17, wherein the instructions are further executable by the processor to:
cause the device to receive, subsequent to establishing the session with the corresponding device, an update to be used by the device to maintain the session.

* * * * *